United States Patent
Fukawatase

(10) Patent No.: US 9,604,556 B2
(45) Date of Patent: Mar. 28, 2017

(54) VEHICULAR SEAT

(75) Inventor: Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/359,789

(22) PCT Filed: Dec. 7, 2011

(86) PCT No.: PCT/JP2011/078347
§ 371 (c)(1),
(2), (4) Date: May 21, 2014

(87) PCT Pub. No.: WO2013/084325
PCT Pub. Date: Jun. 13, 2013

(65) Prior Publication Data
US 2014/0306497 A1    Oct. 16, 2014

(51) Int. Cl.
*B60R 21/207* (2006.01)
*B60N 2/42* (2006.01)
*B60R 21/233* (2006.01)
*B60N 2/427* (2006.01)
*B60R 21/00* (2006.01)

(52) U.S. Cl.
CPC .......... *B60N 2/42* (2013.01); *B60N 2/42763* (2013.01); *B60R 21/207* (2013.01); *B60R 21/233* (2013.01); *B60R 2021/0023* (2013.01)

(58) Field of Classification Search
CPC ................................................. B60R 21/207
USPC .................................. 297/284.11; 280/728.1
See application file for complete search history.

(56) References Cited

U.S. PATENT DOCUMENTS

| | | | |
|---|---|---|---|
| 6,364,348 B1 * | 4/2002 | Jang et al. | 280/730.2 |
| 2003/0222489 A1 | 12/2003 | Takedomi et al. | |
| 2006/0131847 A1 * | 6/2006 | Sato et al. | 280/730.2 |
| 2006/0196715 A1 | 9/2006 | Fujishiro et al. | |
| 2006/0267325 A1 | 11/2006 | Kumagai et al. | |
| 2009/0284066 A1 * | 11/2009 | Higuchi et al. | 297/468 |

FOREIGN PATENT DOCUMENTS

| | | |
|---|---|---|
| DE | 102006000887 A1 | 7/2007 |
| DE | 102008029339 A1 | 1/2009 |
| JP | A-2003-237522 | 8/2003 |
| JP | A-2004-9798 | 1/2004 |
| JP | A-2004-291785 | 10/2004 |

(Continued)

OTHER PUBLICATIONS

Apr. 21, 2015 ESSR issued in European Patent Application No. 11877170.8.

*Primary Examiner* — Keith Frisby
(74) *Attorney, Agent, or Firm* — Oliff PLC

(57) ABSTRACT

A vehicular seat includes: a seat cushion that is disposed offset with respect to a vehicle width direction center of a vehicle; an airbag that is provided in the seat cushion and which, upon receiving a supply of gas, is expanded and deployed in such a way as to suppress a seated occupant from moving toward the front of the vehicle; and gas supplying device which, when actuated at the time of a frontal impact of the vehicle, supplies gas to the airbag in such a way that a vehicle width direction outer side section of the airbag with respect to a vehicle width direction center of the seat cushion is expanded and deployed before an inner side section.

3 Claims, 6 Drawing Sheets

(56) References Cited

FOREIGN PATENT DOCUMENTS

| JP | A-2005-280442 | 10/2005 |
| JP | A-2006-240544 | 9/2006 |
| JP | A-2006-327577 | 12/2006 |
| JP | 2008-114648 A | 5/2008 |
| JP | 2009154746 A | 7/2009 |
| JP | A-2009-143463 | 7/2009 |
| JP | A-2010-47223 | 3/2010 |
| JP | A-2010-64632 | 3/2010 |
| JP | A-2010-95064 | 4/2010 |

* cited by examiner

VEHICULAR SEAT

TECHNICAL FIELD

The present invention relates to a vehicular seat in which an airbag is provided in a seat cushion.

Background Art

Regarding airbags disposed in seat cushions, there is known a configuration where an inner bag that surrounds an inflator is housed in the interior of the airbag and gas is supplied equally to the right and left sides of the airbag from a pair of right and left outflow ports in the inner bag (e.g., see Japanese Patent Application Laid-Open (JP-A) No. 2010-95046).

DISCLOSURE OF INVENTION

Technical Problem

Incidentally, in the case of an offset frontal impact, if the amount of overlap with the opponent vehicle is small, not only an inertial force that tries to move the occupant forward but also an inertial force in a direction heading toward the impact side in the vehicle width direction act on the occupant.

It is an object of the present invention to obtain a vehicular seat with which a seated occupant is suppressed from being moved outward in a vehicle width direction at the time of an offset frontal impact in which the amount of overlap is small (a small overlap frontal impact).

Solution to Problem

A vehicular seat relating to a first aspect of the present invention comprises: a seat cushion that is disposed offset with respect to a vehicle width direction center of a vehicle; an airbag that is provided in the seat cushion and which, upon receiving a supply of gas, is expanded and deployed in such a way as to suppress a seated occupant from moving toward the front of the vehicle; and a gas supplying device which, when actuated at the time of a frontal impact of the vehicle, supplies gas to the airbag in such a way that a vehicle width direction outer side section of the airbag with respect to a vehicle width direction center of the seat cushion is expanded and deployed before an inner side section.

According to the above aspect, the gas supplying device is actuated in a case where (the inevitability of) a frontal impact of the vehicle has been detected. Then, because of the supply of gas from the gas supplying device, the airbag is expanded and deployed and forward movement of the seated occupant is suppressed. Here, upon receiving the supply of gas from the gas supplying device, the vehicle width direction outer side section of the airbag is expanded and deployed before the inner side section, so the seated occupant receives a force inward in the vehicle width direction from the airbag in the process of expanding and deploying. For this reason, in the case of a small overlap frontal impact in which a diagonally forward inertial force heading outward in the vehicle width direction acts on the seated occupant, the movement of the occupant outward in the vehicle width direction can be suppressed by the expansion and deployment of the airbag.

In this way, with the vehicular seat relating to the above aspect, the seated occupant is suppressed from being moved outward in the vehicle width direction at the time of an offset frontal impact in which the amount of overlap is small (a small overlap frontal impact).

In the above aspect, a configuration may be provided, wherein the gas supplying device is configured such that a tubular inflator that has gas discharge holes on one lengthwise direction end side is disposed along the vehicle width direction in the airbag in such a way that the gas discharge holes are positioned on the vehicle width direction outer side in the airbag.

According to the above aspect, the discharge holes in the inflator are disposed on the vehicle width direction outer side with respect to the vehicle width direction center of the airbag, so the gas from the inflator is first supplied to the vehicle width direction outside section of the airbag. Because of this, upon receiving the supply of gas, the vehicle width direction outside section of the airbag is expanded and deployed before the inside section. That is, because of the placement of the inflator, the function of the gas supplying means described above (the effect of the first aspect) can be obtained.

In the above aspect, a configuration may be provided, wherein the vehicular seat is configured to further comprise a partition wall that partitions the space in the airbag into an outer side chamber in which the gas discharge holes are positioned and an inner side chamber adjacent to the vehicle width direction inner side of the outer side chamber and a communicating structure that is disposed in the partition wall and allows movement of the gas from the outer side chamber to the inner side chamber.

According to the above aspect, because of the actuation of the inflator, the gas is first supplied to the outer side chamber in the airbag and the gas is next supplied to the inside chamber through the communicating structure in the partition wall. Because of the communicating structure (e.g., flow path resistance, etc.), a time difference can be set in the expansion and deployment of the outer side chamber and the inner side chamber of the airbag.

In the above aspect, a configuration may be provided, wherein the vehicular seat is configured to further comprise a partition wall that partitions the vehicle front side space in the airbag into an outer side section in which the gas discharge holes are positioned and an inner side section adjacent to the vehicle width direction inner side of the outer side section.

According to the above aspect, because of the actuation of the inflator, the gas is first supplied to the outer side section in the airbag, and the gas is next supplied to the inner side section around the rear portion of the partition wall. Because of the partition wall length and so forth, a time difference can be set in the expansion and deployment of the outer side section and the inner side section of the airbag.

Advantageous Effects of Invention

As described above, with the vehicular seat relating to the present invention, a seated occupant is suppressed from being moved outward in a vehicle width direction at the time of an offset frontal impact in which the amount of overlap is small (a small overlap frontal impact).

BEST MODES FOR CARRYING OUT THE INVENTION

Figure 1:
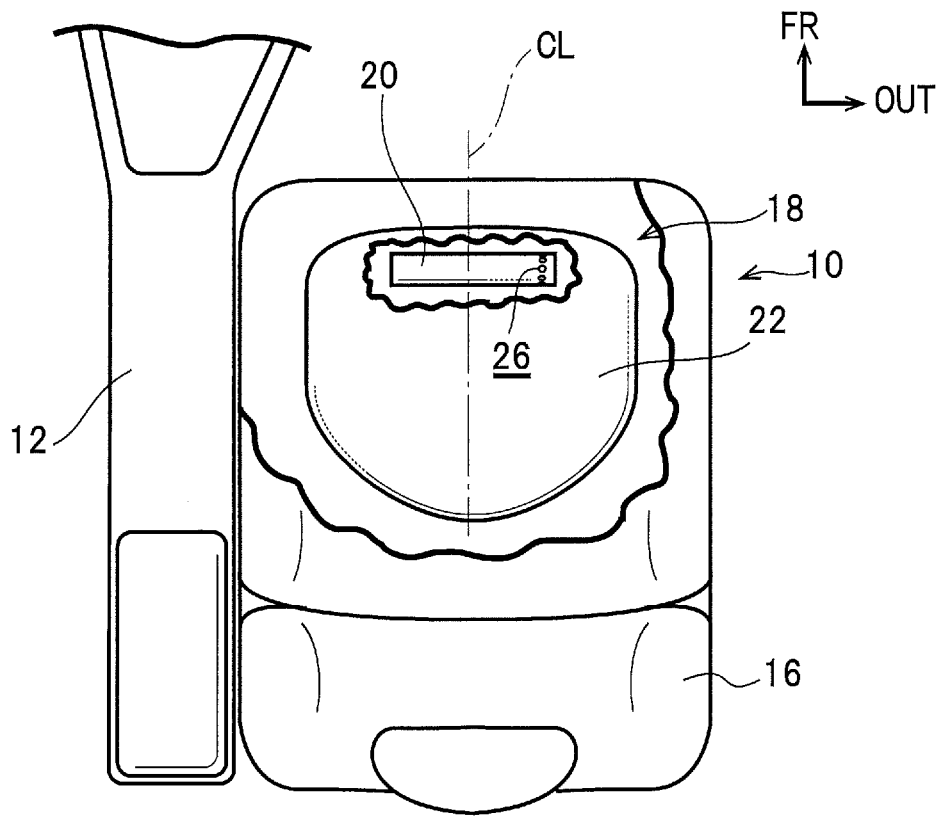
FIG. 1 is a partial cutaway plan view showing a vehicular seat relating to a first embodiment of the present invention.

A vehicular seat 10 relating to a first embodiment of the present invention will be described on the basis of FIG. 1 to FIG. 5. Arrow FR appropriately indicated in the drawings denotes a front direction in a vehicle front and rear direction, arrow UP denotes an up direction in a vehicle up and down direction, and arrow OUT denotes outward in a vehicle width direction. In the following description, in the case of using the directions of front and rear and up and down without special note, these will denote front and rear in the vehicle front and rear direction and up and down in the vehicle up and down direction.

In FIG. 1, the schematic overall configuration of the vehicular seat 10 is shown by way of a partial cutaway plan view. As shown in this drawing, the vehicular seat 10 is disposed on one vehicle width direction side (in the example illustrated, the right side) with respect to a center console 12 that extends frontward and rearward through the vehicle width direction center of the vehicle. That is, the vehicular seat 10 overall does not straddle a vehicle width direction centerline (not illustrated) but is positioned on one vehicle width direction side with respect to the center console 12.

The vehicular seat 10 is configured to include a seat cushion 14 on which an occupant sits and a seat back 16 whose lower end side is connected to the rear end side of the seat cushion and which forms a back rest. Additionally, a cushion airbag device 18 is disposed in the seat cushion 14. The cushion airbag device 18 takes as its main components, and is configured by, an inflator 20 serving as a gas supplying device and a cushion airbag 22 serving as an airbag that expands and deploys upon receiving a supply of gas from the inflator 20.

Figure 4:
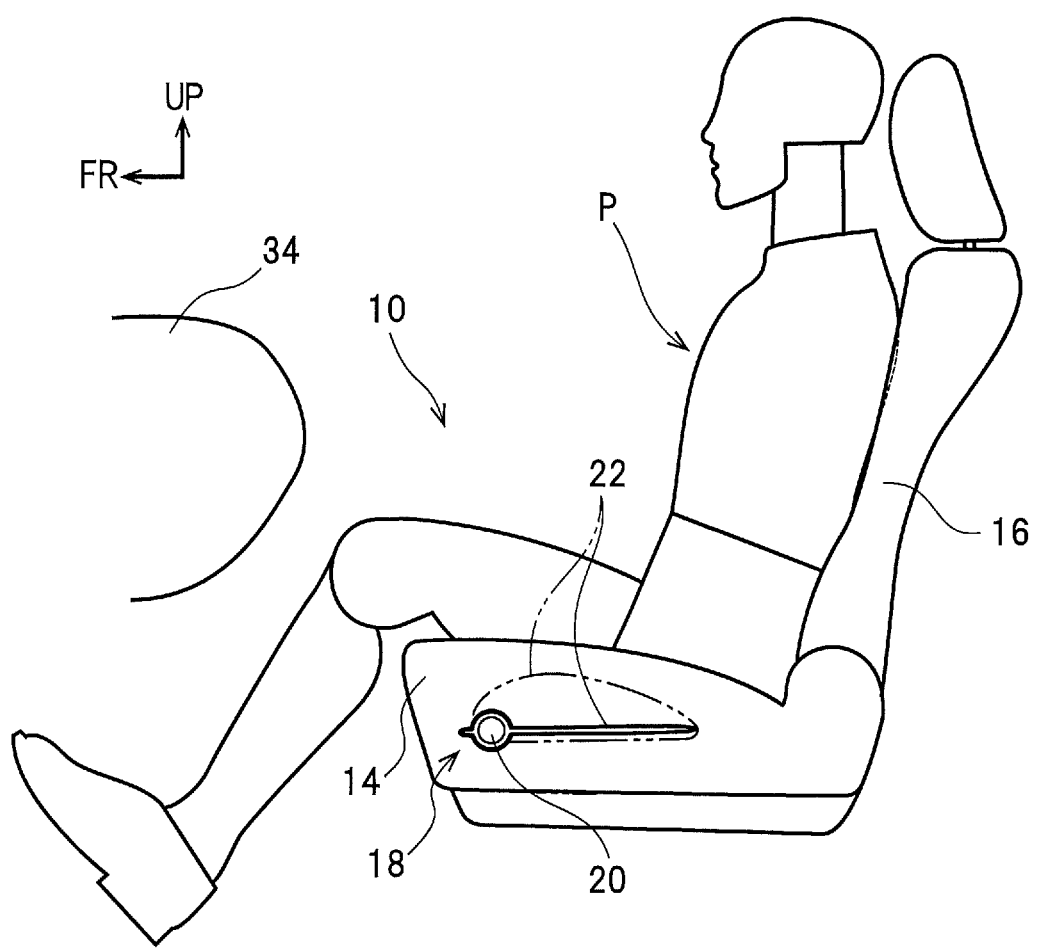
FIG. 4 is a side view showing the vehicular seat relating to the first embodiment of the present invention.

The cushion airbag device 18 is disposed on a non-illustrated seat pan configuring the seat cushion 14 and is configured to raise the thighs of a seated occupant P upward when the cushion airbag 22 is expanded and deployed as indicated by the imaginary line in FIG. 4. Consequently, when the cushion airbag device 18 is actuated at the time of a frontal impact of the vehicle, the thighs of the seated occupant P are raised, whereby movement of the seated occupant P toward the front of the vehicle caused by inertia is suppressed.

Figure 5A:
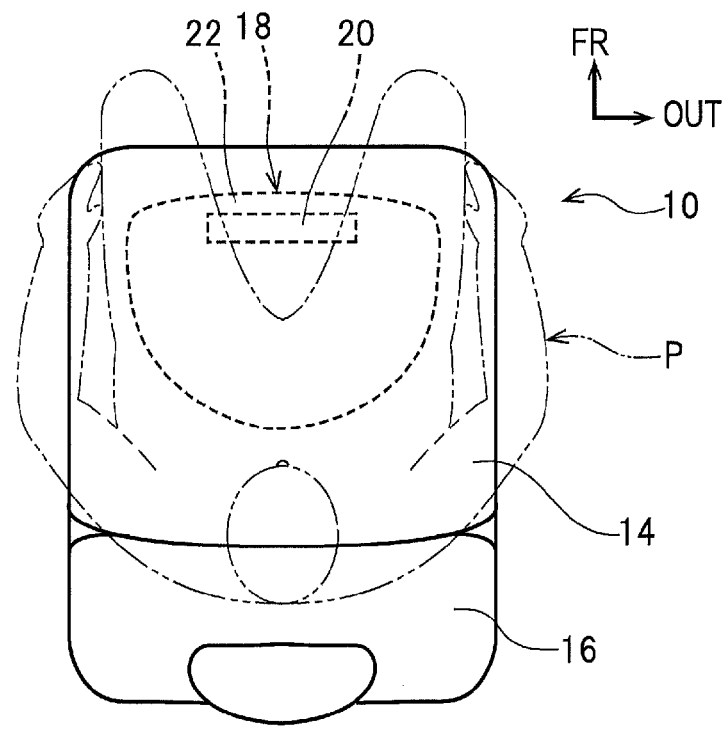
FIG. 5A is a plan view showing a first shape of a cushion airbag configuring the vehicular seat relating to the first embodiment of the present invention.
Figure 5B:
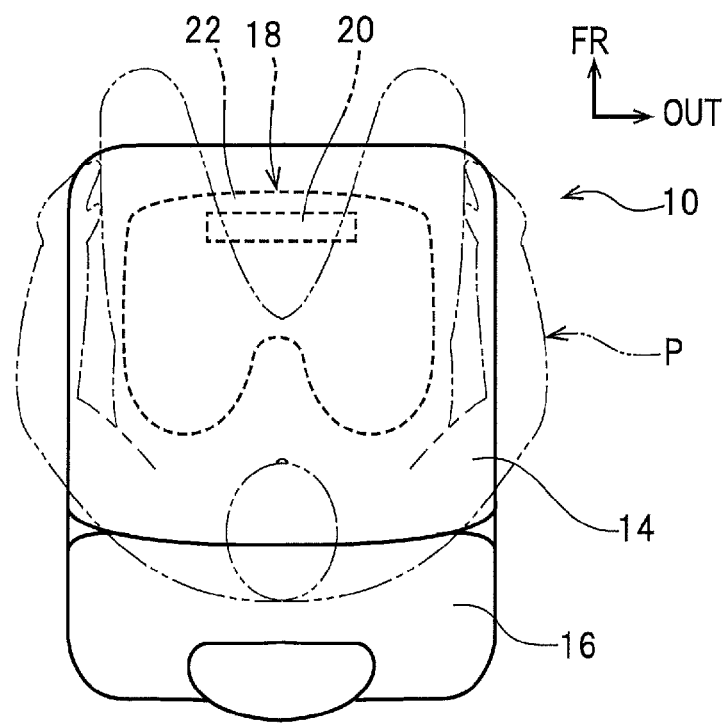
FIG. 5B is a plan view showing a second shape of the cushion airbag configuring the vehicular seat relating to the first embodiment of the present invention.

As shown in FIG. 1, the cushion airbag 22 extends from the neighborhood of the front end of the seat cushion 14 to the section of the seat cushion 14 on the rear side of the front and rear direction center of the seat cushion 14, and the cushion airbag 22 is disposed without being folded up between the seat pan and a cushion material configuring the seat cushion 14. The cushion airbag 22 may be formed in such a way that its rear edge portion is shaped like a circular arc as shown in FIG. 5A, for example, or may be formed in such a way that its rear portion has a bifurcated shape as shown in FIG. 5B, for example, or may formed in another shape. With the shape shown in FIG. 5B, the appropriate places of the thighs of the seated occupant P can be raised with a smaller bag capacity compared to the shape shown in FIG. 5A.

Figure 2:
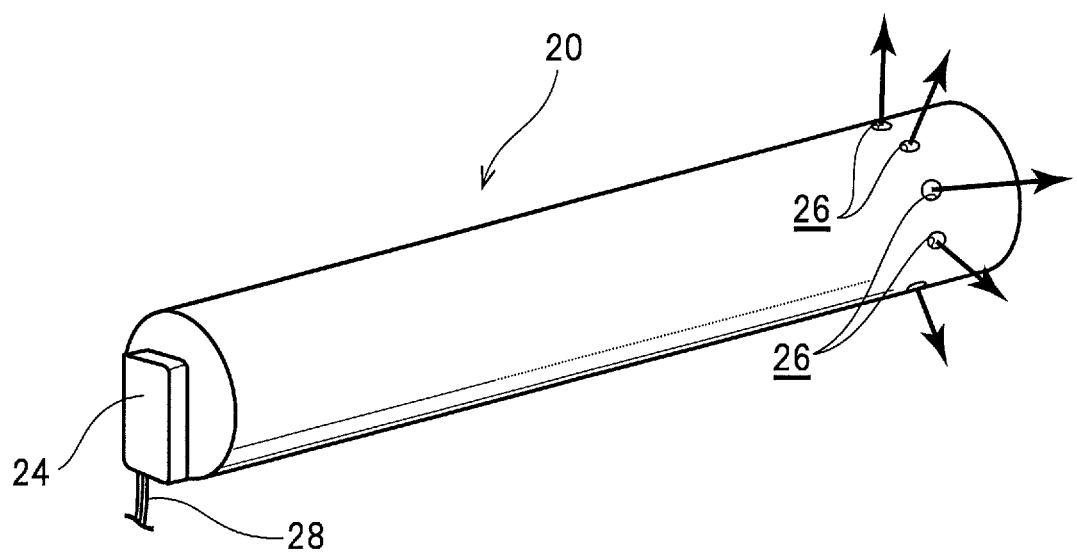
FIG. 2 is a perspective view of an inflator configuring the vehicular seat relating to the first embodiment of the present invention.

As shown in FIG. 2, the inflator 20 has a tubular shape (in the present embodiment, a substantially cylindrical shape) that is long in its axial direction, and a connector 24 electrically connected to a non-illustrated ignition device is connected to one lengthwise direction side of the inflator 20. Gas discharge holes 26 are formed on the other lengthwise direction end side of the inflator 20. Consequently, the inflator 20 has a configuration wherein it discharges gas from the gas discharge holes 26 disposed on the other side in the lengthwise direction when it is actuated. In this embodiment, plural gas discharge holes 26 are formed along the circumferential direction of the inflator 20.

Additionally, as shown in FIG. 1, the inflator 20 is disposed along the vehicle width direction in the front portion in the cushion airbag 22 in such a way that its lengthwise direction coincides with the vehicle width direction. In this state, the gas discharge holes 26 are disposed on the vehicle width direction outer side with respect to a vehicle width direction centerline CL of the cushion airbag 22. Although it is not illustrated, the vehicle width direction centerline CL substantially coincides with a vehicle width direction centerline of (the occupant P seated on) the seat cushion 14. Consequently, the cushion airbag device 18 has a configuration wherein the gas generated by the inflator 20 is supplied to the cushion airbag 22 on the vehicle width direction outer side with respect to the center of the seated occupant P in the vehicle width (right and left) direction.

The connector 24 of the cushion airbag device 18 is electrically connected via a wire harness 28 to a non-illustrated airbag ECU serving as a control device. The airbag ECU has a configuration wherein it actuates the inflator 20 in a case where it has detected (the inevitability of) a frontal impact of the vehicle on the basis of a signal from a non-illustrated frontal impact sensor.

Figure 3:
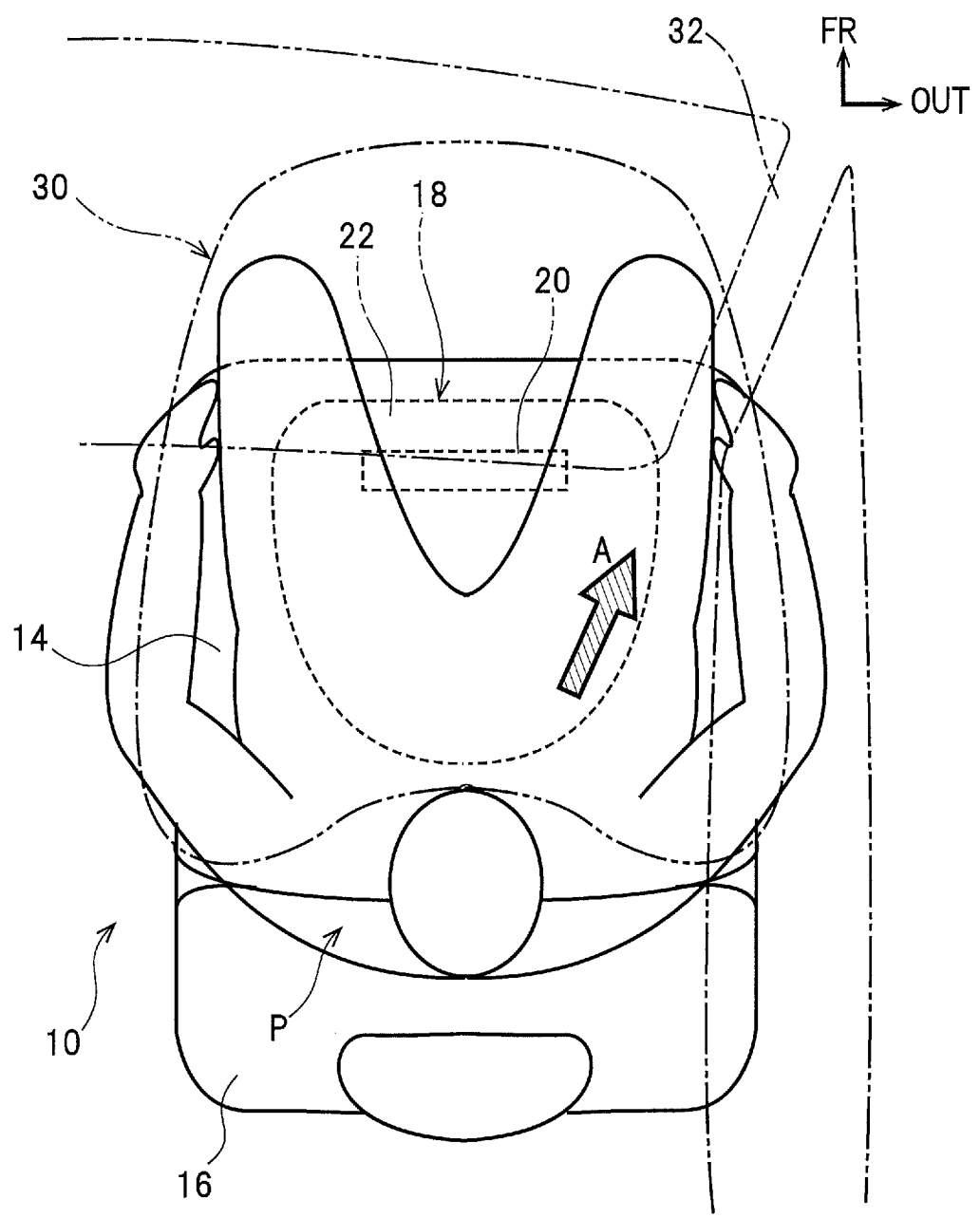
FIG. 3 is a schematic plan view for describing the moving direction, at the time of a small overlap frontal impact, of an occupant seated in the vehicular seat relating to the first embodiment of the present invention.

Furthermore, although it is not illustrated, a seat belt device for restraining the seated occupant P at the time of a frontal impact is disposed on the vehicular seat 10. In this embodiment, a three-point seat belt device is disposed on the vehicular seat 10. Moreover, a frontal impact airbag device for restraining forward movement mainly of the upper body of the seated occupant P at the time of a frontal impact is disposed in an instrument panel or a steering wheel in front of the vehicular seat 10. In FIG. 3, a deployed state of a frontal impact airbag 30 for a front occupant seat deployed from an instrument panel 34 (see FIG. 4) is indicated by an imaginary line.

Next, the operation of the present embodiment will be described.

In the vehicular seat 10 with the above configuration, when a frontal impact of the vehicle is detected, the inflator 20 of the cushion airbag device 18 is actuated. Then, the cushion airbag 22 that has received the supply of gas from the inflator 20 is expanded and deployed in the seat cushion 14 and raises the thighs of the seated occupant P. Because of this, forward movement of mainly the legs of the seated occupant P caused by inertia is suppressed, and the seated occupant P is protected from a collision with the instrument panel or the like. Specifically, diving of the seated occupant P wearing the 3-point seat belt device into the seat cushion 14 (the so-called submarine phenomenon) is suppressed by the cushion airbag 22, whereby forward movement of the seated occupant P is restrained well by the 3-point seat belt device. The cushion airbag device 18 is effective particularly in the case of an automobile employing a thin instrument panel that is flat in the up and down direction, because with a knee airbag it is difficult for the reaction force from the knees of the occupant to be supported by the instrument panel.

Incidentally, in an offset frontal impact in which the amount of overlap in the vehicle width direction with the impact opponent vehicle is small (hereinafter called a "small overlap frontal impact"), an inertial force toward the impact side acts on the seated occupant P in addition to a forward inertial force. Consequently, the seated occupant P seated on the impact side of a small overlap impact becomes moved toward a front pillar 32 as indicated by arrow A in FIG. 3.

Here, in the vehicular seat 10, the inflator 20 supplies gas to the vehicle width direction outer side section in the cushion airbag 22. For this reason, the vehicle width direction outer side of the cushion airbag 22 is expanded and deployed before the vehicle width direction inner side of the cushion airbag 22. Because of this, the expansion and deployment of the cushion airbag 22 progresses in such a way that, during the initial stage of expansion and deployment, the cushion airbag 22 pushes the thighs of the seated occupant P from outward to inward in the vehicle width direction. The seated occupant P who has been pushed from outward in the vehicle width direction by the cushion airbag 22 in the process of expanding and deploying in this way is suppressed from moving outward in the vehicle width direction even in the case of a small overlap frontal impact.

Moreover, simply because of the placement of the inflator 20 having the gas discharge holes 26 positioned on the vehicle width direction outer side in the cushion airbag 22, the cushion airbag device 18 obtains the function of expanding and deploying the vehicle width direction outer side of the cushion airbag 22 before the inner side. That is, movement of the seated occupant P toward the front pillar 32 at the time of a small overlap frontal impact can be suppressed with a simple structure.

[Other Embodiments]

Next, other embodiments of the present invention will be described. Note that parts/portions that are basically the same as the first embodiment or previous configurations are denoted by the same reference numerals as in the first embodiment or previous configurations, and further, there are cases in which description and illustration are omitted.

[Second Embodiment]

Figure 6A:
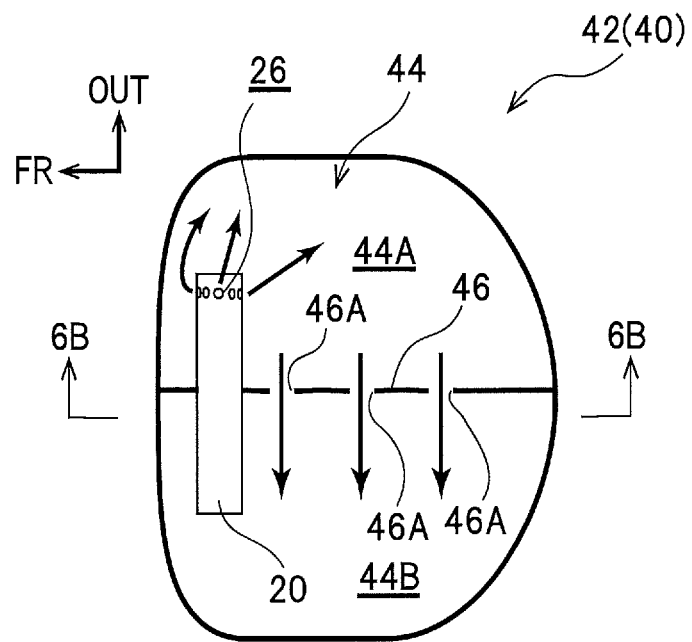
FIG. 6A is a plan sectional view schematically showing a deployed state of a cushion airbag configuring a vehicular seat relating to a second embodiment of the present invention.
Figure 6B:
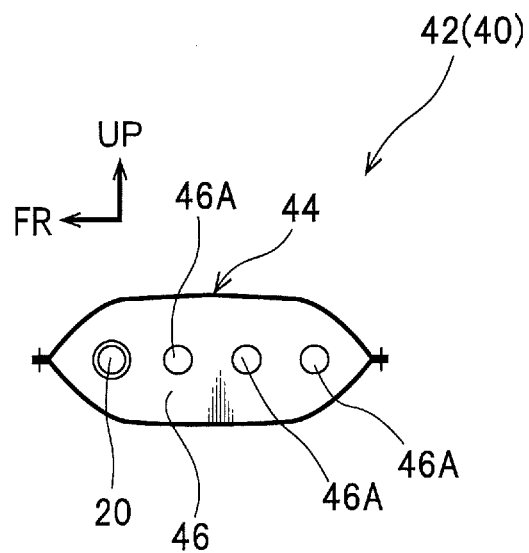
FIG. 6B is a side sectional view along line 6B-6B of FIG. 6A.

In FIG. 6A, a cushion airbag device 42 configuring a vehicular seat 40 relating to a second embodiment is shown by way of a schematic plan sectional view, and in FIG. 6B, a side sectional view along line 6B-6B of FIG. 6A is shown. As shown in these drawings, the cushion airbag device 42 differs from the first embodiment in that it has a cushion airbag 44 with a twin chamber structure instead of the cushion airbag 22 with the single chamber structure.

Specifically, the cushion airbag 44 serving as an airbag has a cloth partition wall 46 disposed in its interior. The interior of the cushion airbag 44 is sectioned, along its entire front and rear direction length by the partition wall 46, into an outer side chamber 44A positioned on the vehicle width direction outer side with respect to the vehicle width direction centerline CL and an inner side chamber 44B adjacent to the vehicle width direction inner side of the outer side chamber 44A. That is, the partition wall 46 is configured to deploy in such a way that the partition wall 46 is positioned on the vehicle width direction centerline CL as seen in a plan view in a deployed state of the cushion airbag 44.

The inflator 20 penetrates the front portion of the partition wall 46, and the gas discharge holes 26 are positioned in the outer side chamber 44A. Because of this, the gas generated as a result of the inflator 20 being actuated is first supplied to the outer side chamber 44A. Furthermore, communicating holes 46A serving as a communicating structure that communicates the outer side chamber 44A and the inner side chamber 44B with one another are formed in the partition wall 46. Consequently, the gas supplied to the outer side chamber 44A is supplied to the inner side chamber 44B through the communicating holes 46A.

In other words, a configuration is provided such that, due to the partition wall 46 in which the communicating holes 46A are formed, the supply of gas to the inner side chamber 44B is delayed with respect to the supply of gas to the outer side chamber 44A to thereby produce a required time difference in the expansion and deployment of the outer side chamber 44A and the inner side chamber 44B. In this embodiment, the communicating holes 46A are plurally formed in the partition wall 46, and the plural communicating holes 46A configure the communicating structure of the present invention. The communicating structure is not limited to the communicating holes 46A and may also be configured to include a tubular section formed in the shape of a cylinder, for example. Furthermore, the gas supplying device of the present invention may be understood as including the inflator 20 and the partition wall 46 in which the communicating holes 46A are formed. Other configurations of the vehicular seat 40 are the same as the corresponding configurations of the vehicular seat 10, including non-illustrated sections.

Consequently, with the vehicular seat 40 relating to the second embodiment also, basically the same effects can be obtained with the same operation as that of the vehicular seat 10 relating to the first embodiment. Furthermore, in the vehicular seat 40, because of the actuation of the inflator 20, the gas is first supplied to the outer side chamber 44A in the cushion airbag 44 and the gas is next supplied to the inner side chamber 44B through the communicating holes 46A in the partition wall 46. In this way, by partitioning (sectioning) the cushion airbag 44 into the outer side chamber 44A and the inner side chamber 44B and using a predetermined structure to communicate the outer side chamber 44A and the inner side chamber 44B with one another, a time difference can be set in the expansion and deployment of the outer side chamber 44A and the inner side chamber 44B. The time difference in the expansion and deployment can be set, for example, by the flow resistance from the outer side chamber 44A to the inner side chamber 44B, which is determined by the size, number, and placement of the communicating holes 46A.

[Third Embodiment]

Figure 7A:
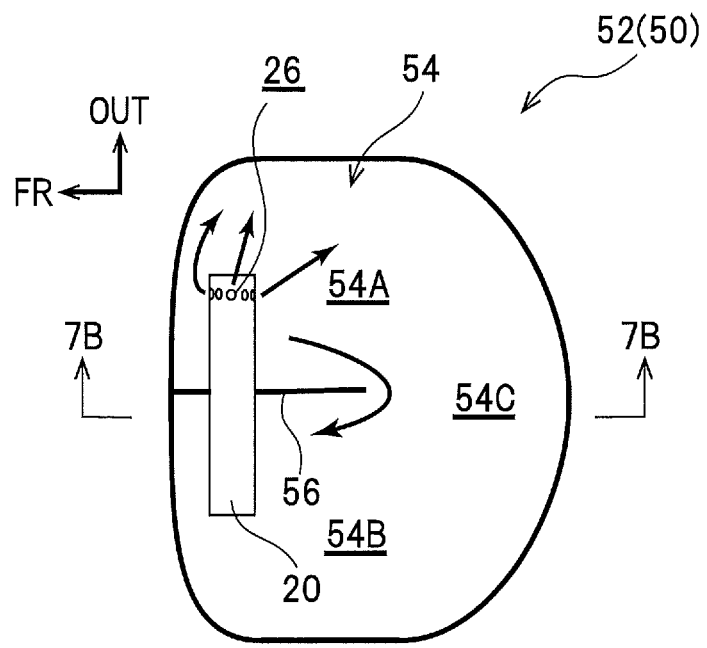
FIG. 7A is a plan sectional view schematically showing a deployed state of a cushion airbag configuring a vehicular seat relating to a third embodiment of the present invention.
Figure 7B:
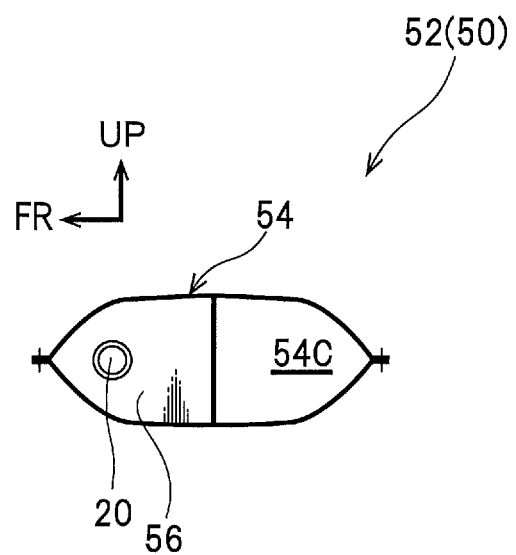
FIG. 7B is a side sectional view along line 7B-7B of FIG. 7A.

In FIG. 7A, a cushion airbag device 52 configuring a vehicular seat 50 relating to a third embodiment is shown by way of a schematic plan sectional view, and in FIG. 7B, a side sectional view along line 7B-7B of FIG. 7A is shown. As shown in these drawings, the cushion airbag device 52 differs from the first embodiment in that it has a cushion airbag 54 with a structure partitioned in the front portion thereof in the vehicle width direction.

Specifically, the cushion airbag 54 serving as an airbag has a cloth partition wall 56 disposed in its interior. The front portion space in the cushion airbag 54 is partitioned by the partition wall 56 into an outer side section 54A positioned on the vehicle width direction outer side with respect to the vehicle width direction centerline CL and an inner side section 54B adjacent to the vehicle width direction inner side of the outer side section 54A. That is, the partition wall 56 is partially disposed in the cushion airbag 54, and is configured to deploy in such a way that the partition wall 56 is positioned on the vehicle width direction centerline CL as seen in a plan view in the deployed state of the cushion airbag 54. The outer side section 54A and the inner side section 54B are communicated with one another through a rear side section 54C positioned on their rear portions.

The inflator 20 penetrates the front portion of the partition wall 56, and the gas discharge holes 26 are positioned in the outer side section 54A. Because of this, the gas generated as a result of the inflator 20 being actuated is first supplied to the outer side section 54A. The gas supplied to the outer side section 54A in this way is supplied to the inner side section 54B through (around) the rear side section 54C. In other words, a configuration is provided such that, due to the partition wall 56, the supply of gas to the inner side section 54B is delayed with respect to the supply of gas to the outer side section 54A to thereby produce a required time difference in the expansion and deployment of the outer side section 54A and the inner side section 54AB. The gas supplying device of the present invention may be understood as including the inflator 20 and the partition wall 56. Other configurations of the vehicular seat 50 are the same as the corresponding configurations of the vehicular seat 10, including non-illustrated sections.

Consequently, with the vehicular seat 50 relating to the third embodiment also, basically the same effects can be obtained with the same operation as that of the vehicular seat 10 relating to the first embodiment. Furthermore, in the vehicular seat 50, because of the actuation of the inflator 20, the gas is first supplied to the outer side section 54A in the cushion airbag 54 and the gas is next supplied to the inner side section 54B through the rear side section 54C. In this way, by partitioning the front portion of the cushion airbag 54, which contributes to suppress the forward movement (including diagonal forward movement) of the seated occupant P, into the outer side section 54A and the inner side section 54B, a time difference can be set in the expansion and deployment of the outer side section 54A and the inner side section 54B. The time difference in the expansion and deployment can be set, for example, by the length of the wraparound path of the gas from the outer side section 54A to the inner side section 54B, which is determined by the length of the partition wall 56.

In each of the embodiments described above, examples were described where the vehicular seats 10, 40, and 50 are front passenger's seats, but the present invention is not limited to this. The vehicular seats 10, 40, and 50 may also be driver's seats or seats from the second row on in a vehicle having plural rows of seats.

Furthermore, in each of the embodiments described above, examples were described where the inflator 20 having the gas discharge holes 26 in one lengthwise direction end was disposed along the vehicle width direction, but the present invention is not limited to this. For example, the inflator 20 may also be disposed along the vehicle front and rear direction. In this case, the vehicle width direction outer side section of the cushion airbag may be expanded and deployed before the inner side section by, for example, making the discharge direction of the gas from the inflator 20 be outward in the vehicle width direction. Furthermore, for example, the partition wall 46 or the partition wall 56 may be utilized to expand and deploy the vehicle width direction outer side section (the outer side chambers 44A and the outer side section 54A) of the cushion airbag before the inner side section (the inner side chambers 44B and the inner side section 54B).

Moreover, in each of the embodiments described above, examples were described where substantially the entire quantity of gas generated by the inflator 20 is first supplied to the vehicle width direction outer side section of the cushion airbag, but the present invention is not limited to this. The vehicle width direction outer side section of the cushion airbag may also be expanded and deployed before the inner side section by, for example, making the quantity of gas supplied to the vehicle width direction outer side section of the cushion airbag greater than the quantity of gas supplied to the inner side section. In this case, for example, two inflators whose outputs are different can be used, or a two-stage-ignition dual inflator having two combustion chambers whose outputs are different can be used.

Furthermore, in each of the embodiments and example modifications described above, examples were described where the cushion airbag device is equipped with a single inflator or where plural inflators are simultaneously actuated, but the present invention is not limited to this. For example, two inflators whose outputs are the same may also be used, with the actuation timings of the two inflators being configured so that the actuation timing of the vehicle width direction outer side inflator precedes the actuation timing of the inner side inflator. Furthermore, for example, a two-stage-ignition dual inflator having two combustion chambers whose outputs are the same may also be used, with the actuation timings of the two combustion chambers being configured so that the actuation timing of the vehicle width direction outer side combustion chamber precedes the actuation timing of the inner side combustion chamber.

Furthermore, in each of the embodiments and example modifications described above, examples were described where the occupant P seated in the vehicular seats 10, 40, and 50 is protected by the cushion airbag devices 18, 42, and 52, the three-point seat belt device, and the frontal impact airbag 30, but the present invention is not limited to this. For example, the present invention may also be applied to a vehicular seat equipped with an occupant protection device instead of the three-point seat belt device. Such an occupant protection device is configured, for example, by installing, in a lap bar disposed in the vehicle width direction in front of and in non-contact with the abdomen of the seated occupant P, a lap belt worn around the waist of the occupant and an airbag that deploys between the upper body of the occupant and the instrument panel at the time of a frontal impact.

In addition, the present invention can be altered in various ways and implemented without departing from the gist thereof.

The invention claimed is:

1. A vehicular seat comprising:
a seat cushion that is disposed offset with respect to a vehicle width direction center of a vehicle;
an airbag that is provided in the seat cushion and which, upon receiving a supply of gas, is expanded and deployed in such a way as to suppress a seated occupant from moving toward the front of the vehicle;the airbag having a rear edge portion that has a bifurcated shape; and
a gas supplying device which, when actuated at the time of a frontal impact of the vehicle, supplies gas to the airbag in such a way that a vehicle width direction outer side section of the airbag with respect to a vehicle width direction center of the seat cushion is expanded and deployed before an inner side section.

2. The vehicular seat of claim 1, wherein the gas supplying device is configured such that a tubular inflator that has gas discharge holes on one lengthwise direction end side is disposed along the vehicle width direction in the airbag in such a way that the gas discharge holes are positioned on the vehicle width direction outer side in the airbag.

3. The vehicular seat of claim 1, wherein the airbag is expanded and deployed in the seat cushion.

* * * * *